Jan. 26, 1937.                W. H. FEENEY                2,069,138
          RECIPROCATING TABLE DRIVE MECHANISM FOR MACHINE TOOLS
                    Filed June 19, 1935          2 Sheets-Sheet 2
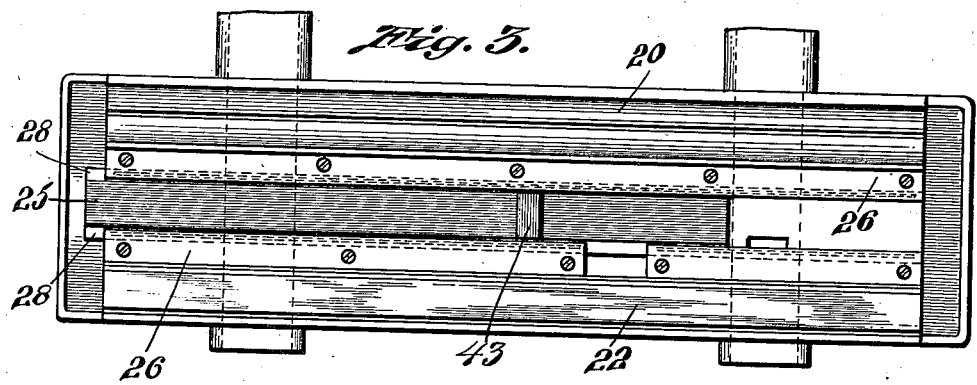
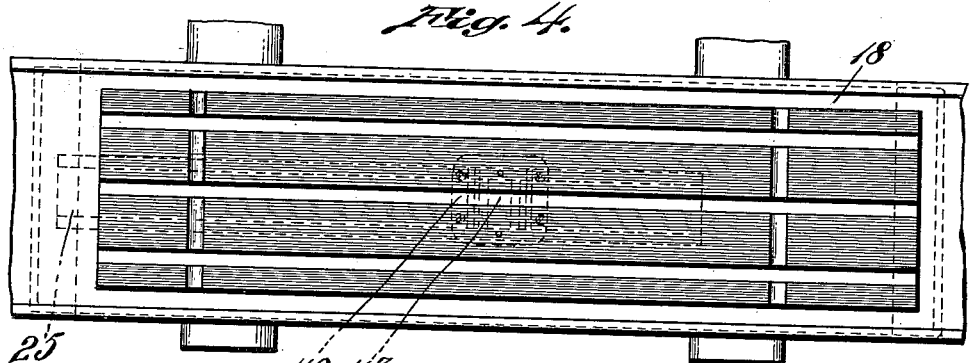
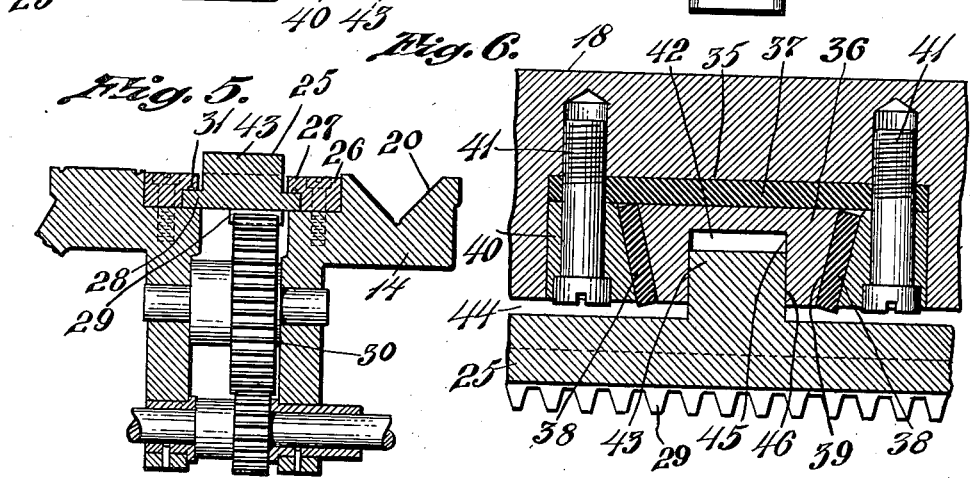
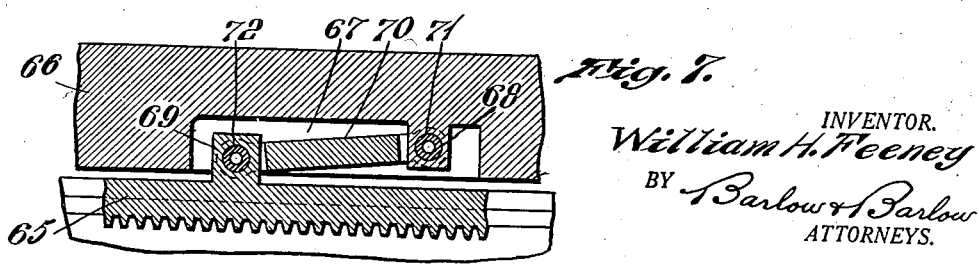
INVENTOR.
William H. Feeney
BY Barlow & Barlow
ATTORNEYS.

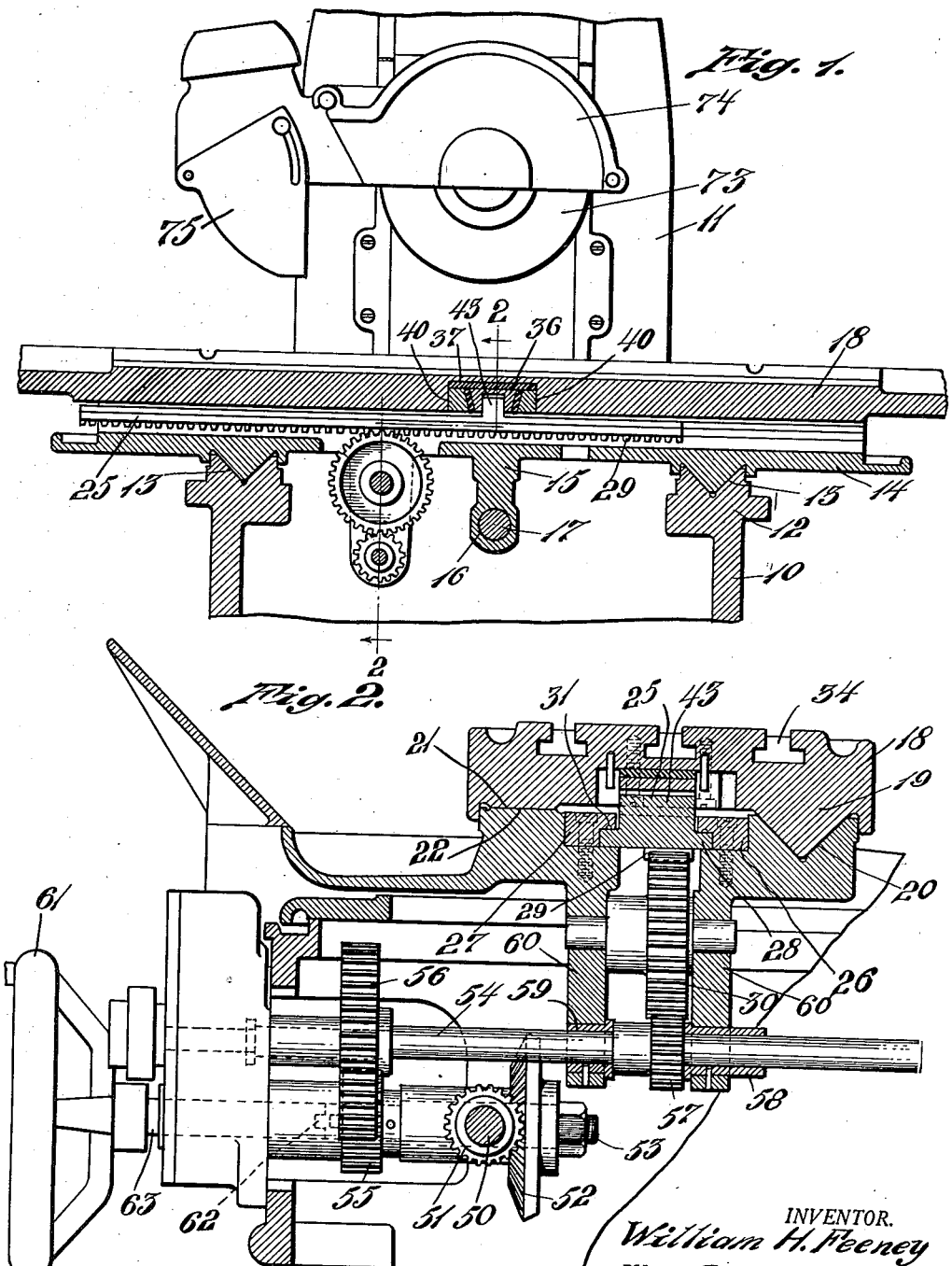

Patented Jan. 26, 1937

2,069,138

UNITED STATES PATENT OFFICE 2,069,138

RECIPROCATING TABLE DRIVE MECHANISM FOR MACHINE TOOLS

William H. Feeney, East Providence, R. I., assignor to Brown & Sharpe Manufacturing Company, a corporation of Rhode Island Application June 19, 1935, Serial No. 27,309

18 Claims. (Cl. 74—27)

This invention relates to a mechanism for reciprocating a table, such as is used on machine tools; and has for one of its objects the prevention of transfer of vertical vibration in the drive mechanisms to the reciprocating table.

Another object of the invention is to so arrange the drive mechanism that the parts which are connected to the reciprocating table are permitted vertical movement and also other relative movements without transmitting these movements to the table.

Another object of the invention is the provision of means which will absorb the irregular transmission of driving movements due to eccentricity of pinions of different thicknesses or dimensions of the teeth either on the pinions or on the driving rack, and thus prevent transmitting of vibration due to such irregularities to the reciprocating table.

Another object of the invention is to provide a somewhat floating connection between the driving mechanism and the reciprocating table so that jars or small movements will not be transmitted thereto.

Another object of the invention is to entirely divorce and separate the rack which drives the reciprocating table from the table so that there will be no transmission of vibration of the rack to the table.

Another object of the invention is to make unnecessary the reducing of the thickness of the rack as the ways which guide the table wear down which has heretofore been necessary when the ways were worn to such an extent that the rack rested upon the pinion and was supported thereby.

Another object of the invention is to prevent lifting of the table due to any of the driving parts.

With these and other objects in view, the invention consists of certain novel features of construction, as will be more fully described, and particularly pointed out in the appended claims.

In the accompanying drawings:

Fig. 1 is a fragmental sectional view through the reciprocating table and carriage but otherwise looking generally at the front of the standard;

Fig. 2 is a sectional view on substantially the line 2—2 of Figure 1 with the gears in full;

Fig. 3 is a plan view of the carriage with the table removed;

Fig. 4 is a view similar to Figure 3 with the table shown in position on the carriage;

Fig. 5 is a fragmental sectional view showing the gears for driving the rack;

Fig. 6 is a fragmental sectional view on an enlarged scale, showing the connection of the rack to the table;

Fig. 7 is a sectional view of a fragmental portion of the table and rack with a modified form of connection between them.

In commercial practice, it is usual to drive a reciprocating table by rigidly securing a rack to the under surface of the table and driving the rack by means of a pinion. Any irregularities in the teeth of the rack or pinion or eccentricities of the pinion cause a transmission of vibration to the table causing irregularities in the work, which is particularly detrimental and objectionable in grinding; and although there is some vibration at the ends of the stroke of the table due to the reversal of the movement, the vibration which I particularly desire to eliminate and do away with, is the vertical vibration which may be transmitted from the rack to the table. And in order to accomplish this result, I have arranged a rack which is entirely divorced and separate from the table so far as its mounting is concerned, and I have connected it to the table through an arrangement which will permit of its vertical movement relative to the table without transmitting the vertical movement or vibration to the table by leaving a space above the connection of the rack to the table, and although I confine it against longitudinal movement relatively to the table, it may still be permitted vertical movement by sliding along these connecting means. I have also provided in this same unit an arrangement to cushion and prevent vibration or shock due to the reversal of movement of the table at the ends of its stroke or path of travel; and the following is a more detailed description of the present embodiment of this invention, illustrating the preferred means by which these advantageous results may be accomplished:

With reference to the drawings, 10 indicates the base of the machine with the upright portion 11. A bed 12 is provided on this base which is formed with V-shaped grooves 13 receiving the V-shaped projections of a carriage 14 for slidably mounting it thereon. A cross feed for operating the carriage laterally of the machine is effected by means of an arm 15 secured to the carriage and having a threaded bore 16 through which a screw shaft 17 extends.

This carriage 14 has mounted thereon a table 18 which is guided in its reciprocating movements by means of an interfitting V-shaped projection 19 on the table and correspondingly shaped groove 20 in the carriage along one side; while the opposite margin of the under surface of the table has a flat sliding portion 21 to engage the flat surface 22 on the carriage at a point spaced from this interfitting projection and groove 19 and 20. This table is designed for movement at right angles to the cross feed of the carriage.

A rack 25 having laterally extending lips 28 is slidably mounted on the carriage by means of gibs 26 with overhanging portions 27 extending over the lips 28 on the rack, while the middle of the rack is flush with the upper surfaces of the gibs. The toothed portion 29 of the rack extends below these gibs for engagement with a gear 30 for driving the same. The under surfaces of the overhanging portions 27 of the gibs are provided with oil grooves 31 to assist in the retaining of oil for lubrication of the sliding of the rack therein.

The table 18 is provided with the usual inverted T-shaped slot 34 in its upper surface for fastening of work thereto and on the underside of the table a recess 35 is cut out which receives a block 36. A rubber cushioning pad 37 is positioned along the top of the block and between it and the table. The block 36 is held in position by being tapered at its ends 39 and the wedge-shaped pieces 40 secured by bolts 41 to the table. Rubber cushioning pads 38 are positioned between the block 36 and the wedging holding pieces 40 which effect a complete mounting of the block in rubber. Thus, a cushioning at the ends of the stroke of the table is had at the time of the reversal of the direction of travel of the table.

A recess 42 is provided in the block 36 for the reception of a lug or finger 43 which is a part of the rack 25. The table above the rack is spaced a substantial distance, as at 44, while the lug 43 is spaced from the top or end of the recess 42 so that there may be vertical movement of the rack with reference to the table by a sliding of the lug in the recess without transmission of any vertical movement to the table. The sides 45 of the recess and the end surfaces 46 of the lug 43 are vertical so that one may slide with reference to the other without the transmission of any vibration or longitudinal movement, such as would be the case were the rack a part of or rigidly attached to the table. These two surfaces 45 and 46 fit snugly so that movement of the rack or thrust longitudinally of the table would be imparted thereto, although there will be a cushioning at the commencement of such movement or the end of the stroke or at the time of reversal of movement by reason of the rubber cushion 38 which will also absorb any vibration from the driving mechanism to the table.

Power is supplied to shaft 50 which through beveled gears 51 and 52 rotates shaft 53 which transmits rotation to shaft 54 through gears 55 and 56. A pinion 57 is splined upon shaft 54 and rotates the gear 30 which engages the rack teeth 29. This pinion 57 slides along the shaft 54 as the carriage 14 is adjusted transversely of the machine, the same being mounted between the bushings 58 and 59 in the arms 60 depending from the carriage. A table hand wheel 61 is provided with a clutch 62 on the end of the shaft 63 so that the table may optionally be driven through the gears by hand instead of through the power supplied to the shaft 50.

In Figure 7, I have shown a modified form of connection between a rack 65 and table 66. The table is provided with a recess 67 in which is located a lug 68, while a lug 69 on the rack is joined to the lug 68 by a link 70 which will transmit longitudinal movement to the rack, although there will be permitted a relative vertical movement of the table and rack without transmission of this vertical movement from one part to the other. The link 70 is connected to the lugs through rubber cushioning bushings 71 and 72 to absorb any vibration and lessen the shock at the ends of the travel of the table.

On the upper part of the standard there is mounted a tool which is designated 73, here shown as a grinding wheel, with a wheel guard 74 and dust deflector 75, all of a known construction and vertically adjustable in a known manner for operation on the work which is secured to the table 18.

By the above arrangement I may transmit longitudinal movement to the table through cushioning means to lessen the vibration at the ends of the stroke or at the times of reversal, although I permit vertical movement of the parts and also cushion the block against the transmission of any movement through the sliding of these parts so that any vibration in the drive mechanism which may be transmitted to the rack due to the irregularity of the teeth of the rack or the pinion or the eccentricity of the pinion, will not be transmitted to the work table and accordingly a smoother surface may be had on the work and chatter marks and the like will be prevented.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. The combination of a part to be reciprocated, a driving mechanism, and means in continual driving engagement with said part and permitting vertical sliding movement relative to said part for connecting said part and said driving mechanism for the transmission of reciprocating movement to said part in a plane at generally right angles to the vertical.

2. The combination of a part to be reciprocated in a generally horizontal plane, a driving mechanism, and means continually connecting said part and said driving mechanism including a member permitting vertical sliding movement relative to said part for the transmission of horizontal reciprocating movement to said part.

3. The combination of a table to be reciprocated, a driving mechanism including a pinion, and a rack mounted to permit its vertical vibration relative to said table yet being mounted entirely separate therefrom, said rack being connected thereto in positive and continuous driving engagement for transmitting reciprocating movement in opposite directions generally perpendicular to the vertical.

4. The combination of a table to be reciprocated, a driving mechanism including a pinion, a rack mounted to permit its vertical vibration relative to said table yet being mounted entirely separate therefrom, and yielding means connecting the rack and table in positive and continuous driving engagement for transmitting reciprocating movement in opposite directions generally perpendicular to the vertical.

5. The combination of a table to be reciprocated, a power element, and means permitting vertical sliding movement relatively to the table and connecting the table and power element in positive and continuous driving engagement for the transmission of longitudinal reciprocating movement.

6. The combination of a table to be reciprocated, a power element, and a floating member through which said table and power element are positively and continually connected for transmitting reciprocating movement to said table, said member being permitted vertical sliding movement with reference to said table.

7. The combination of a table to be reciprocated provided with a recess in its under surface, and power means including a finger extending into said recess and movable therein, said finger serving as the only means of connecting said power means and table for reciprocation thereof, said finger being always in driving engagement with said table to reciprocate the latter.

8. The combination of a table to be reciprocated provided with a recess in its under surface, and power means including a finger extending into said recess and movable therein through which a longitudinal reciprocating movement is given said table, said finger extending into the recess short of the inner end thereof so that a relative movement axially of the recess of one will not be transmitted to affect the other, said finger being in continuous driving engagement with said table to reciprocate the latter.

9. The combination of a table to be reciprocated, a block mounted in cushion means on the underside of said table and having a recess therein, and power means including a finger extending into said recess and movable therein for reciprocating said table in a plane at generally right angles to the vertical.

10. The combination of a table to be reciprocated, a block mounted in rubber on the underside of said table and having a recess therein, and power means including a vertically slidable finger entering said recess for reciprocating said table in a plane at generally right angles to the vertical, said finger extending into the recess short of the end thereof so that a relative movement axially of the recess of one will not affect the other.

11. The combination of a table to be reciprocated, a block mounted in rubber on the underside of said table and having a recess therein, a rack for reciprocating said table and mounted entirely separate therefrom, a finger on the rack and movable within said recess to accommodate for vertical vibration relative to said table yet connecting said rack for reciprocating said table.

12. The combination of a support, a table longitudinally movably mounted thereon, a slideway on said support, a rack mounted on said support independently of said table and longitudinally slidable in said slideway, and means for connecting said rack to the table to permit relative vertical movement thereto and to maintain connection for longitudinal reciprocation of said table.

13. The combination of a support, a table longitudinally movably mounted thereon and provided with a recess in its under surface, a slideway on said support, a rack mounted on said support and independently of said table and longitudinally slidable in said slideway, and a finger on said rack extending into said recess short of the end thereof and movable therein, said finger serving as the only means of connection of said rack and table.

14. The combination of a transversely movable carriage, a table longitudinally movably mounted thereon and provided with a recess in its under surface, a slideway on said carriage, a rack slidable in said slideway and mounted independently of said table, and a finger on said rack extending into said recess short of the bottom thereof and movable therein, said finger serving as the only means of connection of said rack and table.

15. The combination of a support, a table longitudinally movably mounted thereon, a block mounted in rubber on the underside of said table and having a recess therein, a slideway on said support, a rack slidable in said slideway and mounted independently of said table, and a finger for connecting said rack to the table to permit relative vertical movement and to maintain connection for reciprocation, said finger on said rack extending into said recess short of the end thereof.

16. The combination of a support, a reciprocable table above the support and having slideways between it and the support, a drive mechanism for reciprocating said table yet separate therefrom, and means connecting said drive mechanism to said table and mounted independently of the latter member for permitting vertical movement relative to the table to maintain said connection effective for longitudinally reciprocating said table after wear of said slideways as before wear thereof.

17. In a machine tool, in combination, a support, a reciprocable work table, a driving mechanism for mechanically reciprocating said table including a slidable member mounted on said support independently of said table, guiding means on said support for supporting and guiding said table during reciprocation thereof, additional means on said support for supporting and guiding said driving member during its sliding movement thereon, and means connecting said slidable member of the driving mechanism for reciprocating said table.

18. In a machine tool, in combination, a support, a reciprocable work table, a driving mechanism for mechanically reciprocating said table including a pinion and a slidable rack mounted on said support independently of said table, a set of guideways on said support for supporting and guiding said table during reciprocation thereof, a second set of guideways on said support for supporting and guiding said rack during its sliding movement thereon, and means connecting said slidable rack of the driving mechanism for reciprocating said table.

WILLIAM H. FEENEY.